United States Patent
Kim et al.

(10) Patent No.: US 10,223,572 B2
(45) Date of Patent: Mar. 5, 2019

(54) FINGERPRINT DETECTING APPARATUS AND DRIVING METHOD THEREOF

(71) Applicant: IDEX ASA, Fornebu (NO)

(72) Inventors: Kyung Saeng Kim, Gyeonggi-Do (KR); Jeong Min Kim, Gyeonggi-Do (KR)

(73) Assignee: Idex ASA, Fornebu (NO)

( * ) Notice: Subject to any disclaimer, the term of this patent is extended or adjusted under 35 U.S.C. 154(b) by 22 days.

(21) Appl. No.: 15/125,099

(22) PCT Filed: Mar. 12, 2014

(86) PCT No.: PCT/EP2014/054793
§ 371 (c)(1),
(2) Date: Sep. 9, 2016

(87) PCT Pub. No.: WO2015/135578
PCT Pub. Date: Sep. 17, 2015

(65) Prior Publication Data
US 2017/0017828 A1    Jan. 19, 2017

(51) Int. Cl.
G06K 9/00    (2006.01)

(52) U.S. Cl.
CPC ....... *G06K 9/00053* (2013.01); *G06K 9/0002* (2013.01)

(58) Field of Classification Search
None
See application file for complete search history.

(56) References Cited

U.S. PATENT DOCUMENTS

| | | | |
|---|---|---|---|
| 6,681,033 B1 | 1/2004 | Yano et al. | |
| 6,836,230 B2 | 12/2004 | Le Pailleur et al. | |
| 7,864,992 B2 * | 1/2011 | Riedijk | G06K 9/0002 382/124 |
| 9,323,975 B2 * | 4/2016 | Riedijk | G06K 9/00013 |

(Continued)

FOREIGN PATENT DOCUMENTS

| | | |
|---|---|---|
| KR | 1014622260000 | 11/2014 |
| KR | 1014731890000 | 12/2014 |

(Continued)

OTHER PUBLICATIONS

International Search Report issued in International Patent Application No. PCT/EP2014/054793, 3 pages (dated Jul. 15, 2014).

(Continued)

*Primary Examiner* — Randolph I Chu
(74) *Attorney, Agent, or Firm* — Rothwell, Figg, Ernst & Manbeck, P.C.

(57) ABSTRACT

A fingerprint detecting apparatus includes a plurality of fingerprint sensor devices. Each of the plurality of fingerprint sensor devices includes a first conductive layer in which a sensing electrode configured to receive a response signal from a subject according to application of a driving voltage is formed, a shield layer formed under the first conductive layer, and to which a ground potential is applied, a second conductive layer formed under the shield layer, a third conductive layer formed in a part under the second conductive layer, a gain controller formed between the second conductive layer and the third conductive layer, and configured to selectively vary again, and an amplifier configured to generate an output signal formed by amplifying the response signal as much as the gain. The response signal and the output signal are received and output independently from an adjacent fingerprint sensor device.

17 Claims, 8 Drawing Sheets

(56) References Cited

U.S. PATENT DOCUMENTS

| | | | | |
|---|---|---|---|---|
| 9,638,549 | B2* | 5/2017 | Chen | G01D 5/24 |
| 2004/0021786 | A1* | 2/2004 | Nakamura | G06K 9/0004 |
| | | | | 348/294 |
| 2009/0079550 | A1* | 3/2009 | Makinen | G06F 3/016 |
| | | | | 340/407.2 |
| 2010/0084542 | A1 | 4/2010 | Chou | |
| 2014/0352440 | A1* | 12/2014 | Fennell | G01N 29/22 |
| | | | | 73/632 |
| 2015/0115981 | A1 | 4/2015 | Christie et al. | |
| 2016/0104024 | A1* | 4/2016 | Slogedal | G06K 9/0002 |
| | | | | 324/649 |
| 2016/0252785 | A1* | 9/2016 | Kimura | G02F 1/13338 |
| | | | | 349/12 |
| 2017/0308228 | A1* | 10/2017 | Benkley, III | G06K 9/00013 |

FOREIGN PATENT DOCUMENTS

| | | |
|---|---|---|
| KR | 1020130074798 | 1/2015 |
| KR | 1015029040000 | 3/2015 |
| KR | 1020130149956 | 3/2015 |
| KR | 1020130158725 | 5/2015 |
| KR | 1015372310000 | 7/2015 |
| WO | WO 2005124659 A1 | 12/2005 |
| WO | WO 2015084062 | 6/2015 |

OTHER PUBLICATIONS

Written Opinion issued in International Patent Application No. PCT/EP2014/054793, 7 pages (dated Jul. 15, 2014).

Rathna, N., et al., "Automatic Fingerprint Recognition Systems, Chp. 2," Advances in Fingerprint Sensors Using RF Imaging, New York, Springer Verlag, US, pp. 27-53 and cover (Jan. 1, 2003).

Substantive Examination Report issued in European Patent Application No. 14 709 931.1, 4 pages (dated Oct. 16, 2017).

International Preliminary Report on Patentability dated Sep. 13, 2016, International Application No. PCT/EP2014/054793, 7 pages.

* cited by examiner

FINGERPRINT DETECTING APPARATUS AND DRIVING METHOD THEREOF

CROSS-REFERENCE TO RELATED APPLICATION

This application is a 35 U.S.C. 371 National Phase Entry Application from PCT/EP2014/054793, filed Mar. 12, 2014, the disclosure of which is incorporated herein in their entirety by reference.

BACKGROUND

1. Field of the Invention

The present invention relates to a fingerprint detecting apparatus and a method of driving the same. More specifically, the present invention relates to a fingerprint detecting apparatus in which sensitivity, in the way of detecting a fingerprint using a feedback capacitance, is appropriately adjusted as needed, and influences of external noise, electrostatic discharge, etc. are suppressed, and a driving method thereof.

2. Discussion of Related Art

A fingerprint pattern is different for every person and thus widely used in personal identification. In particular, a fingerprint is widely used in various fields, such as finance, criminal investigations, security, etc. as a means for personal authentication.

A fingerprint detecting sensor has been developed to identify an individual by detecting a fingerprint. The fingerprint detecting sensor is a device which contacts a finger of a person and recognizes a fingerprint of the finger, and used as a means for determining whether he/she is a legitimate user or not.

Recently, needs for personal authentication and security enhancement are rapidly increasing in mobile markets, and security-related businesses through mobile systems are being actively proceeding.

Reflecting this trend, studies for commercializing a semiconductor-type single-chip fingerprint sensor are actively conducted in many companies. However, in order to use a fingerprint detecting sensor chip in a mobile terminal, a high sensitive capacitive sensor circuit and other circuits which are insensitive to noise, are required for obtaining a reliable fingerprint image. Further, since a fingerprint detection chip is normally installed in a mobile apparatus, low power is a basic feature of the chip.

Various detecting methods, such as optical methods, thermal sensing methods, and capacitive methods, are known as a method of implementing a fingerprint detecting sensor.

Among them, the principle of a capacitive fingerprint sensor is that a fingerprint image is formed by converting a difference of capacitances formed between an uppermost metal plate and a ridge of a fingerprint and between the uppermost metal plate and a valley of the fingerprint into an electrical signal to compare a size of the electric signal with a size of a reference signal, and then digitalizing and imaging thereof.

As a method of processing a signal sensed by the uppermost metal plate, a charge sharing method, a feedback capacitive sensing method, a sample and hold method, a charge transfer method, etc. may be provided. Among them, the feedback capacitive sensing method has an advantage in that, since a circuit is simple, the size of a sensor electrode, i.e. the uppermost metal plate can be reduced while a high quality image is obtained. However, the fingerprint sensor using the feedback capacitive sensing method has a problem in that the best sensitivity is not provided in signal processing. The reason is that it is difficult to accurately detect a difference of response signals formed by a relationship between the uppermost metal plate and a ridge of a finger and a relationship between the uppermost metal plate and a valley of the finger, due to a thickness of a molding structure formed on the uppermost metal plate. That is, thickness variations of the molding structure disposed between the finger and the uppermost metal plate may limit the operating range of a reference voltage, and act as a decisive factor degrading the quality of the fingerprint image formed by the fingerprint detecting apparatus.

Accordingly, a technology of enabling a feedback capacitive sensing type fingerprint detecting apparatus to obtain an optimal sensitivity level and be insensitive to various changes in a surrounding environment.

SUMMARY OF THE INVENTION

An objective of the present invention is to solve problems of an existing technology described above.

Another objective of the present invention is to variably optimize a sensitivity level of a feedback capacitive sensing type fingerprint detecting apparatus depending on the circumstances.

Still another objective of the present invention is to suppress an influence of external noise on a fingerprint detecting apparatus.

According to an aspect of the present invention, there is provided a fingerprint detecting apparatus including a plurality of fingerprint sensor devices. Each of the plurality of fingerprint sensor devices includes a first conductive layer in which a sensing electrode configured to receive a response signal from a subject according to application of a driving voltage is formed, a shield layer formed under the first conductive layer, and to which a ground potential is applied, a second conductive layer formed under the shield layer, a third conductive layer formed in a part under the second conductive layer, a gain controller formed between the second conductive layer and the third conductive layer, and configured to selectively vary a gain, and an amplifier configured to generate an output signal formed by amplifying the response signal as much as the gain. The response signal and the output signal are received and output independently from an adjacent fingerprint sensor device.

The fingerprint detecting apparatus may further include an external electrode configured to apply the driving voltage to the subject.

The first conductive layer may include a driving voltage applying electrode configured to apply the driving voltage to the subject, and a sensing electrode spaced apart from the driving voltage applying electrode and configured to receive the response signal from the subject.

The third conductive layer may include n sub-electrodes formed in a part under the second conductive layer to form n feedback capacitances along with the second conductive layer, and each of the n sub-electrodes may be selectively connected to an output of the amplifier to vary the gain.

The fingerprint detecting apparatus may further include a fourth conductive layer connected to the output of the amplifier, and selectively connected to each of the n sub-electrodes.

The third conductive layer may include a guard electrode formed between the sub-electrodes, spaced apart from each of the sub-electrodes, and connected to the ground potential.

The fingerprint detecting apparatus may further include a first switch configured to switch connection between the first conductive layer and the output of the amplifier, a second switch connected to between an input of the amplifier and the output of the amplifier, and configured to reset the gain controller, a third switch connected to the output of the amplifier, and configured to selectively output the output signal, and n fourth switches, each connected to between each sub-electrode and the fourth conductive layer, and configured to selectively vary the gain.

The first switch may maintain an on-state only while the driving voltage is applied, and may input a response signal from the sensing electrode independently from an adjacent sensing electrode, the second switch may maintain an on-state before the driving voltage is applied and resets the gain controller, and the third switch may maintain an on-state only after the driving voltage is applied, and outputs an output signal of the amplifier independently from an adjacent sensing electrode.

The third conductive layer may be formed as part of a metal-insulator-metal (MIM) structure.

The first conductive layer may include a guard ring formed apart from the sensing electrode to surround the sensing electrode and connected to the ground potential.

The second conductive layer may include a feedback capacitance electrode forming a feedback capacitance with the third conductive layer, and a guard ring formed apart from the feedback capacitance electrode to surround the feedback capacitance electrode and to which the ground potential is applied.

According to another aspect of the present invention, there is provided a method of driving a fingerprint detecting apparatus including a plurality of fingerprint sensor devices having first to third conductive layers sequentially arranged from a top to a bottom. The method includes determining a gain of a gain controller which is formed between a second conductive layer and a third conductive layer formed in a part under the second conductive layer and varies a gain of an amplifier, resetting the gain controller connected between an input of the amplifier and an output of the amplifier, connecting a sensing electrode formed in the first conductive layer to the input of the amplifier so that a response signal from a subject according to application of a driving voltage is input from the sensing electrode to the amplifier, and connecting the output of the amplifier to an external apparatus to output an output signal of the amplifier.

A shield layer to which a ground potential is applied may be further formed between the first conductive layer and the second conductive layer.

The driving voltage may be applied to the subject through an external electrode.

The driving voltage may be applied to the subject through a driving voltage applying electrode formed apart from the sensing electrode in the first conductive layer.

The determination of a gain of the gain controller may include selectively connecting n feedback capacitances formed between n sub-electrodes formed in the third conductive layer and the second conductive layer, to the output of the amplifier.

The determination of a gain of the gain controller may include selectively connecting a fourth conductive layer formed under the third conductive layer and connected to the output of the amplifier, to the n feedback capacitances.

The reset of the gain controller, the input of the response signal to the amplifier, and the connection of the amplifier output and the external apparatus may be exclusively performed from each other.

The input of the response signal to the amplifier and the output of the output signal of the amplifier to the external apparatus may be performed independently from an operation in an adjacent fingerprint sensor device.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
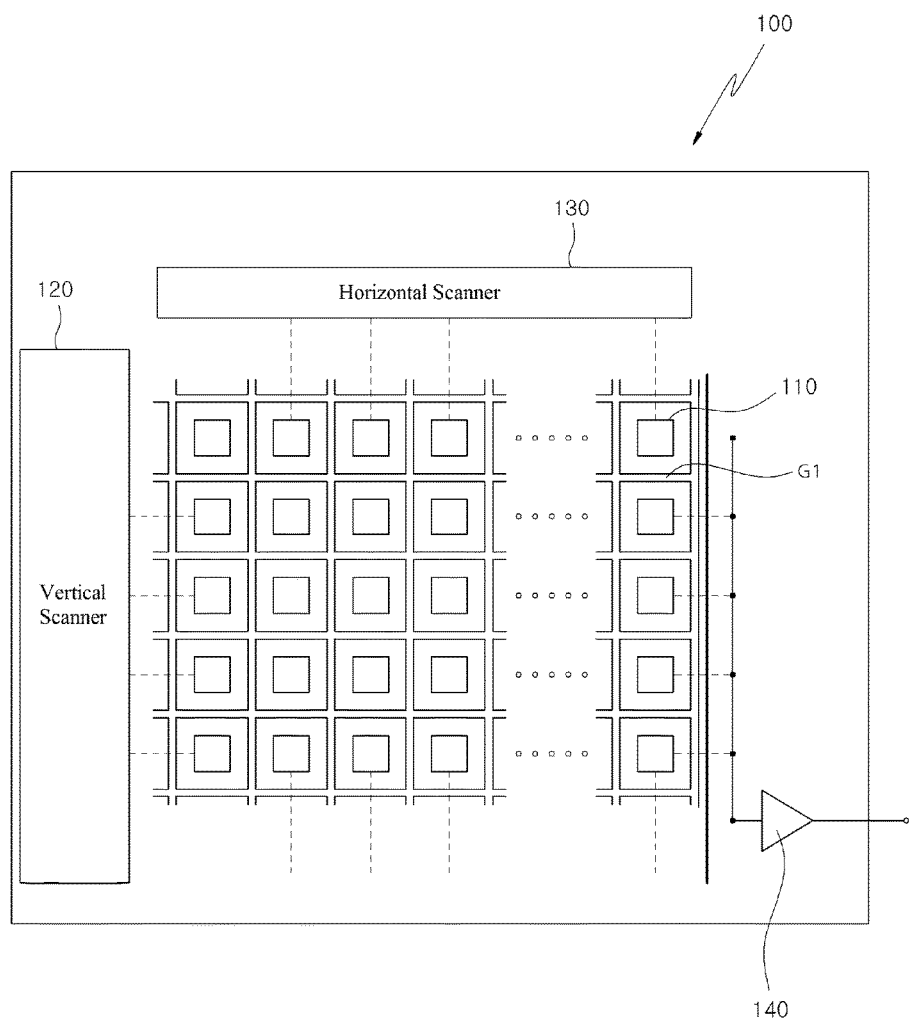
FIG. 1 is a diagram showing a schematic configuration of a fingerprint detecting apparatus in accordance with an embodiment of the present invention.

Various embodiments will now be described more fully with reference to the accompanying drawings in which some embodiments are shown. However, since the invention is not limited to the embodiments disclosed hereinafter, the embodiments of the invention should be implemented in various forms. In the drawings, some additional components that have no relationship to explanation of example embodiments of the present invention may be omitted for clarity, and like numerals refer to like elements throughout the specification.

It will be understood that when an element is referred to as being "connected to" or "coupled to" another element, it may be directly connected or coupled to the other element or it may be indirectly connected or coupled to another element with an intervening element therebetween. It will be further understood that the terms "comprises," "comprising," "includes," and/or "including," when used herein, specify the presence of elements and/or components, but do not preclude the presence or addition of one or more elements and/or components unless stated otherwise.

Hereinafter, embodiments of the present invention will be described in detail with reference to the accompanying drawings.

FIG. 1 is a diagram showing a schematic configuration of a fingerprint detecting apparatus in accordance with an embodiment of the present invention.

Referring to FIG. 1, a fingerprint detecting apparatus includes a sensor array 100 having a plurality of fingerprint sensor devices 110 which form a plurality of columns and rows. Each of the fingerprint sensor devices 110 is enabled by a horizontal scanner 130 and a vertical scanner 120 to output a signal related to detection of a fingerprint. The signal from the fingerprint sensor device 110 is output through a buffer 140. One buffer 140 is arranged at every column of the fingerprint sensor devices 110. That is, a signal from the fingerprint sensor device 110 disposed at one column is output through one buffer 140.

Figure 2:
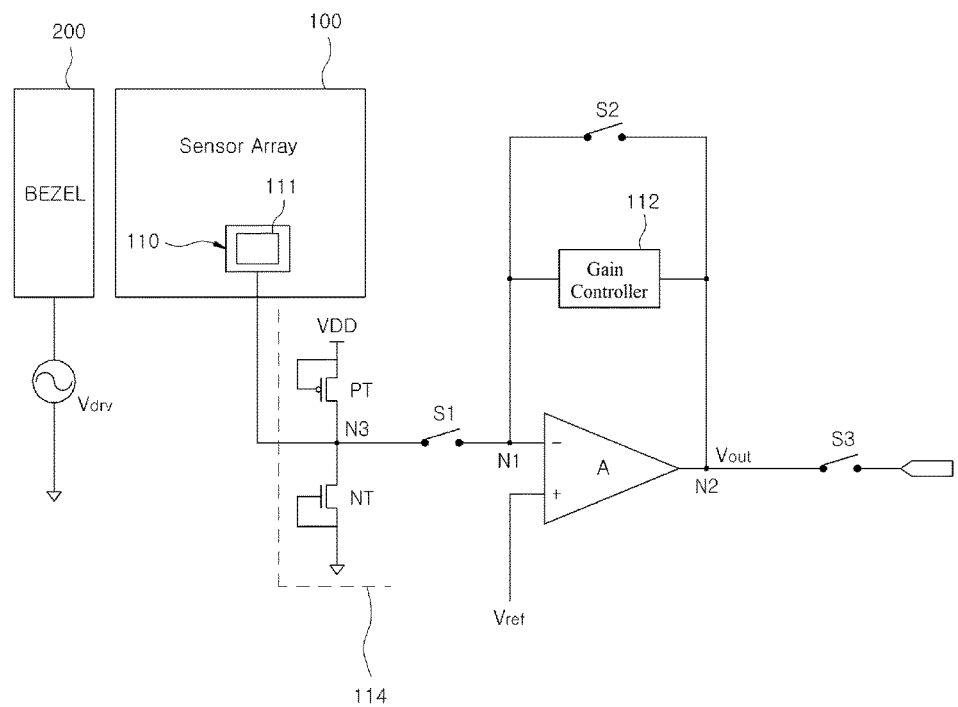
FIG. 2 is a diagram for describing a configuration of a fingerprint sensor device in accordance with a first embodiment of the present invention.

FIG. 2 is a diagram for describing a configuration of the fingerprint sensor device 110 in FIG. 1 in accordance with a first embodiment of the present invention.

Referring to FIG. 2, the fingerprint detecting apparatus includes the sensor array 100 and an external electrode (or a bezel, 200). The external electrode 200 is isolated from the sensor array 100 and disposed therearound. The external electrode 200 functions to transmit a driving voltage Vdrv for detection of a fingerprint to a subject (a finger). That is, the driving voltage Vdrv is applied to the external electrode 200, and the driving voltage Vdrv is supplied to a finger of a person through the external electrode 200. Then, as a response thereto, a predetermined signal is output from each fingerprint sensor device 110 of the sensor array 100.

Meanwhile, the sensor array 100 includes, as described above, the plurality of fingerprint sensor devices 110 that form columns and rows. The fingerprint sensor device 110 in accordance with the first embodiment of the present invention includes an electrode as a sensing electrode 111. The sensing electrode 111 is selectively connected to a first input N1 of an amplifier A. A reference voltage Vref is supplied to a second input of the amplifier A. The first input N1 and the second input of the amplifier A may be an inverting input terminal and a non-inverting input terminal, respectively. A gain controller 112 is connected between the first input N1 and an output N2 of the amplifier A. The gain controller 112 is an element for varying a gain of the amplifier A, which will be described later in detail.

Meanwhile, an electrostatic discharge (ESD) protection circuit 114 may be further formed between the sensing electrode 111 and the first input N1 of the amplifier A.

The ESD protection circuit 114 is a circuit for preventing an electrostatic discharge, i.e. ESD generated between the sensing electrode 111 and the amplifier A, and includes a PMOS transistor PT and an NMOS transistor NT which are connected in series between a power voltage VDD and a ground potential. Each gate of the PMOS transistor PT and NMOS transistor NT is commonly connected to a source thereof.

When a bipolar electrostatic discharge higher than the power voltage VDD occurs between the sensing electrode 111 and the first input N1 of the amplifier A, the PMOS transistor PT is turned on and the NMOS transistor NT is turned off. At this time, the maximum potential of a node N3 disposed between the PMOS transistor PT and the NMOS transistor NT is limited to a value of the power voltage VDD plus a threshold voltage of the PMOS transistor PT.

Meanwhile, when a negative electrostatic discharge lower than the ground potential occurs between the sensing electrode 111 and the first input N1 of the amplifier A, the NMOS transistor NT is turned on and the PMOS transistor PT is turned off. At this time, the minimum potential of the node N3 between the PMOS transistor PT and the NMOS transistor NT is limited to a value of the ground potential minus a threshold voltage of the NMOS transistor NT.

Accordingly, even when a bipolar electrostatic discharge or a negative electrostatic discharge is input, the electrostatic discharge, i.e., ESD can be prevented since a voltage limited to a value below or above a certain level is transmitted.

Meanwhile, since the above described is only an example of a configuration of the ESD protection circuit 114, the ESD protection circuit 114 can be implemented to another conventional configuration and disposed on a different position from the above described. The ESD protection circuit 114 may be omitted as well. Connection between the first input N1 of the amplifier A and the sensing electrode 111 turns on/off by a first switch S1, and a second switch S2 is connected between both ends of the gain controller 112. In addition, a third switch S3 is connected to the output N2 of the amplifier A. The first switch S1 is a switch that serves for the fingerprint sensor device 110 to receive a signal from a finger according to a driving voltage Vdrv, the second switch S2 is a switch that resets data stored in the gain controller 112 of the amplifier A. In addition, the third switch S3 is a switch that selectively opens an output of the fingerprint sensor device 110, that is, a switch that selectively controls an output signal of the fingerprint sensor device 110 to be transmitted to an external apparatus. Operations of the first to third switches S1 to S3 during detection of a fingerprint will be described later, in detail.

Hereinafter, a configuration of the fingerprint sensor device 110 of FIG. 2 will be described in detail with reference to FIGS. 3 and 4.

Figure 3:
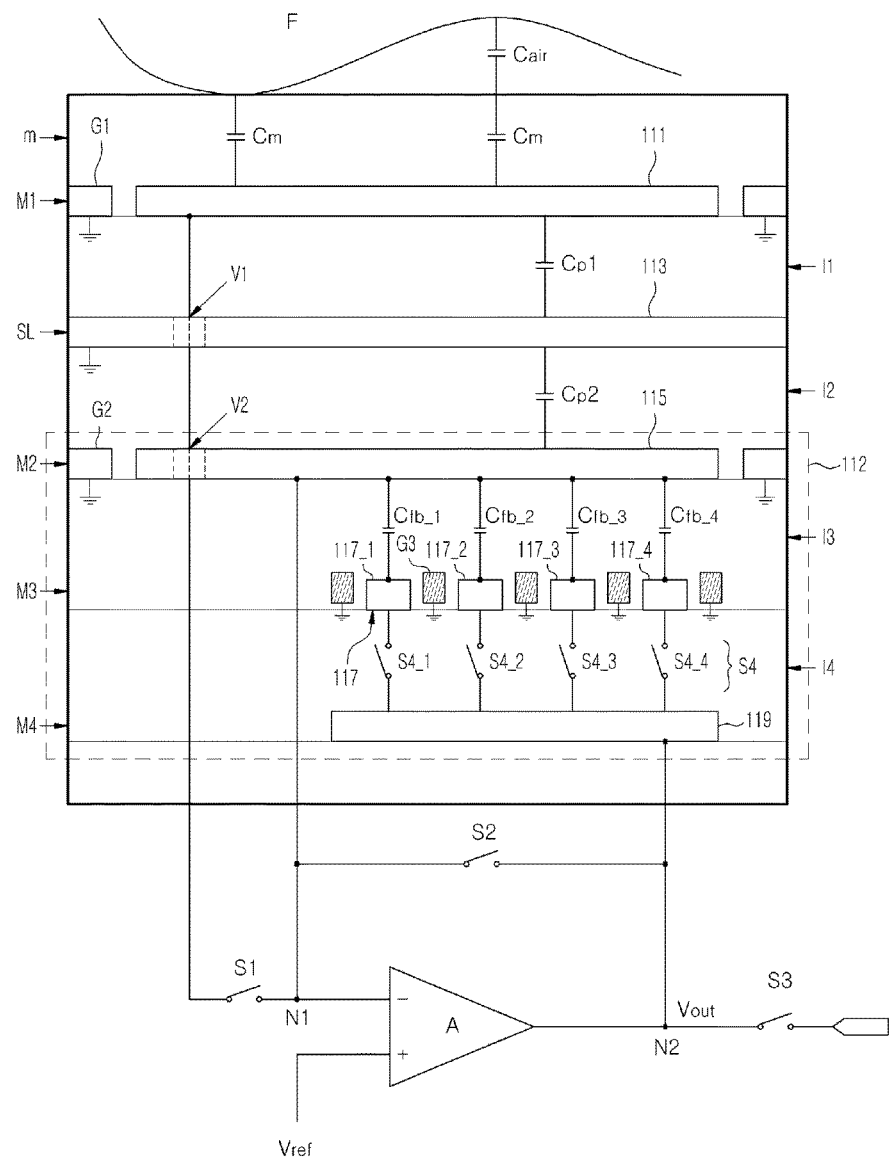
FIGS. 3 and 4 are respectively a cross-sectional view and a perspective view showing a configuration of the fingerprint sensor device in accordance with the first embodiment of the present invention.
Figure 4:
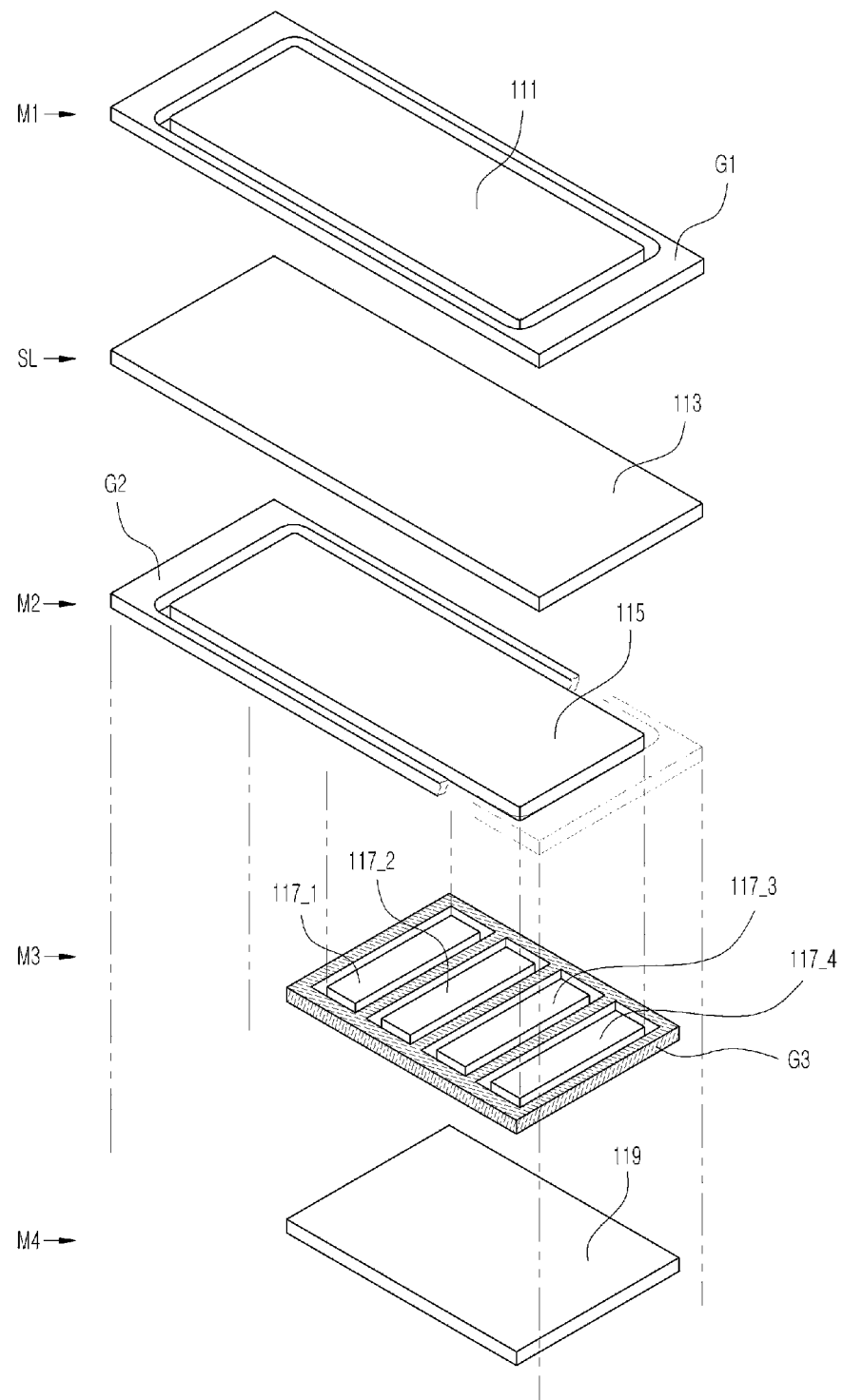

FIGS. 3 and 4 are respectively a cross-sectional view and a perspective view showing a configuration of the fingerprint sensor device 110. FIG. 4 only shows a configuration of conductive layers M1 to M4 and a shield layer SL in FIG. 3 for clarity of the drawing.

Referring to FIGS. 3 and 4, the fingerprint sensor device 110 is formed in a structure including a plurality of conductive layers M1 to M4 and a shield layer SL. The conductive layers M1 to M4 may be metal layers to which certain voltages are applied, and the shield layer SL is a metal layer to which a ground potential is applied. Insulating layers 12, 12, 13, and 14 are formed between the conductive layers M1 to M4, and between the conductive layers M1 and M2 and the shield layer SL. The insulating layers 12, 12, 13, and 14 may be formed of a conventional insulating material, such as SiO2, SiN, SiNOX, glass, etc.

A first conductive layer M1 is the uppermost layer to which a sensing electrode 111 is disposed.

The sensing electrode 111 is connected to the first input N1 of the amplifier A, and the connection is on/off by the first switch S1. A wire connecting the sensing electrode 111 and the first input N1 of the amplifier A passes through a shield electrode 113 of the shield layer SL, and a first feedback capacitance electrode 115 of a second conductive layer M2. For this purpose, via holes V1 and V2 may be formed on the shield electrode 113 and the first feedback capacitance electrode 115.

Meanwhile, a shield electrode surrounding a periphery of the sensing electrode 111, i.e. a guard ring G1 is formed in the first conductive layer M1. The guard ring G1 may be connected to the ground potential or another appropriate potential to minimize generation of a parasitic capacitance due to a relationship with an adjacent fingerprint sensor device 110. A plurality of guard rings G1 may be formed. For example, a first guard ring G1 is formed, and a second guard ring (not shown) may be formed to surround a periphery of the sensing electrode 111 and the first guard ring G1. In this case, the first guard ring G1 may be connected to the ground potential. Although the guard ring G1 is described to have a ring shape in this embodiment, it is not limited thereto. The guard ring G1 may be formed in various shapes, such as a circular shape, a non-circular shape, a polygonal shape, etc. and formed as a protection electrode to minimize interference from an adjacent metal.

A protection layer m protecting the sensing electrode 111 is formed on the uppermost conductive layer M1. The protection layer m protects the sensing electrode 111 from ESD and outer abrasion.

The sensing electrode 111 forms a capacitance in relation to a finger F in contact with the sensing electrode 111. The finger F is formed of ridges and valleys, and each sensing electrode 111 forms a different capacitance when it touches a ridge of the finger F from when it touches a valley of the finger F. When the sensing electrode 111 touches a ridge of the finger F, a capacitance Cm corresponding to a thickness of the molding layer m is formed between the sensing electrode 111 and the finger F. When the sensing electrode 111 touches a valley of the finger F, a capacitance Cm corresponding to a thickness of the molding layer m and a capacitance Cair corresponding to an air layer between the molding layer m and the valley of the finger F are formed between the sensing electrode 111 and the finger F. Like this, a capacitance formed between the sensing electrode 111 and the finger F is changed depending on which part of a fingerprint is in contact with the sensing electrode 111, and an output signal Vout is changed depending on the capacitance. Accordingly, it is possible to find out features of the ridge and valley through the size of the output signal Vout.

The shield layer SL is formed under the first conductive layer M1 includes the shield electrode 113. The shield electrode 113 is connected to the ground potential. As described later, a feedback capacitance of the amplifier A is formed by the gain controller 112 consisting of the second conductive layer M2 to the fourth conductive layer M4, and parasitic capacitances Cp1 and Cp2 may exist between the sensing electrode 111 of the first conductive layer M1 and the first feedback capacitance electrode 115 of the second conductive layer M2. The first parasitic capacitance Cp1 is a parasitic capacitance formed by a relation between the sensing electrode 111 and the shield electrode 113, and the second parasitic capacitance Cp2 is a parasitic capacitance formed by a relation between the shield electrode 113 and the first feedback capacitance electrode 115.

First, the first parasitic capacitance Cp1 is described. Since the sensing electrode 111 is the closest electrode to the finger F, the first parasitic capacitance Cp1 may be much affected by accessibility to the finger F or other external noises. However, since the shield electrode 113 is connected to the ground potential, charges stored in the first parasitic capacitance Cp1 escape to the ground potential. That is, the effect of the first parasitic capacitance Cp1 during detection of a fingerprint is minimized due to the shield electrode 113.

Next, the second parasitic capacitance Cp2 is described. The second parasitic capacitance Cp2 is formed between the shield electrode 113 and the first feedback capacitance electrode 115. The shield electrode 113 is connected to the ground potential, and the first feedback capacitance electrode 115 is connected to the first input N1 of the amplifier A to have a potential of a reference voltage Vref in the ideal case. That is, since a potential difference (a voltage) between the shield electrode 113 and the first feedback capacitance electrode 115 remains constant, and each area of the shield electrode 113 and the first feedback capacitance electrode 115, a distance between the shield electrode 113 and the first feedback capacitance electrode 115, and a dielectric constant of the insulating layer 12 disposed between the shield electrode 113 and the first feedback capacitance electrode 115 are values known by design, the second parasitic capacitance Cp2 is a calculable value. The calculable second parasitic capacitance Cp2 can be easily removed using a separate parasitic capacitance removal circuit, or can be used as a value to be compensated during detection of a fingerprint. Further, through the calculation thereof, the amount of capacitance of the gain controller 112 to be explained later can be adjusted by compensating the calculated second parasitic capacitance Cp2.

In summary, a noise due to the first parasitic capacitance Cp1 among the parasitic capacitances between the first conductive layer M1 and the second conductive layer M2 is naturally removed by the shield electrode 113, and a noise due to the second parasitic capacitance Cp2 is easily removed or compensated since it is a calculable value. That is, an effect from the external noises can minimized and the accuracy of detection of a fingerprint can be improved by interposing the shield layer SL between the first conductive layer M1 and the second conductive layer M2.

The second to fourth conductive layers M2 to M4 configure the gain controller 112 that determines the amount of feedback capacitance of the amplifier A, which will be described hereinafter, in detail.

The second conductive layer M2 and the third conductive layer M3 include the first feedback capacitance electrode 115 and a second feedback capacitance electrode 117. The first feedback capacitance electrode 115 is connected to the first input N1 of the amplifier A, and the second feedback capacitance electrode 117 is connected to the output N2 of the amplifier A. A plurality of sub-feedback capacitances Cfb_1, Cfb_2, Cfb_3, and Cfb_4 are formed between the first feedback capacitance electrode 115 and the second feedback capacitance electrode 117. The second feedback capacitance electrode 117 is composed of sub-electrodes 117_1, 117_2, 117_3, and 117_4, and an end of each of the sub-feedback capacitances Cfb_1, Cfb_2, Cfb_3, and Cfb_4 is connected to a respective one of the sub-electrodes 117_1, 117_2, 117_3, and 117_4. The amounts of the sub-feedback capacitances Cfb_1, Cfb_2, Cfb_3, and Cfb_4 are the same or different. For example, when the amount of a first sub-feedback capacitance Cfb_1 is X, the amounts of second to fourth sub-feedback capacitances Cfb_2, Cfb_3, and Cfb_4 may be respectively X2, X3, and X4, but are not limited thereto.

The sub-electrodes 117_1, 117_2, 117_3, and 117_4 configuring the second feedback capacitance electrode 117 are formed depending on the number of the sub-feedback capacitances Cfb_1, Cfb_2, Cfb_3, and Cfb_4. In the drawings, four sub-feedback capacitances Cfb_1, Cfb_2, Cfb_3, and Cfb_4 are exemplarily described, however, the number of the sub-feedback capacitances Cfb_1, Cfb_2, Cfb_3, and Cfb_4 may be changed, and accordingly the number of the sub-electrodes 117_1, 117_2, 117_3, and 117_4 configuring the second feedback capacitance electrode 117 may be changed. Each of the sub-electrodes 117_1, 117_2, 117_3, and 117_4 is selectively connected to the output N2 of the amplifier A. That is, the sub-electrodes 117_1, 117_2, 117_3, and 117_4 may be selectively connected to the output N2 of the amplifier A by a plurality of fourth switches S4_1, S4_2, S4_3, and S4_4. Accordingly, only some of the sub-feedback capacitances Cfb_1, Cfb_2, Cfb_3, and Cfb_4 are selected, and a composite capacitance of the selected sub-feedback capacitances Cfb_1, Cfb_2, Cfb_3, and Cfb_4 may function as the feedback capacitance of the amplifier A. For example, assuming that the first sub-feedback capacitance Cfb_1 and the second sub-feedback capacitance Cfb_2 are selected, a capacitance in which the two sub-feedback capacitances are combined in parallel functions as the feedback capacitance of the amplifier A.

The output voltage Vout of the amplifier A may vary depending on the amount of a feedback capacitance, and more specifically, may be expressed as follows. Here, Vdrv is the amount of a driving voltage applied to an external electrode (reference numeral 200 of FIG. 2). In addition, Cdrive is an input capacitance of the amplifier A, i.e. a capacitance in which a capacitance formed between the sensing electrode 111 and the finger F, a capacitance formed by the molding layer m, etc. are combined in series.

$$V_{out} = \left(\frac{C_{drive}}{C_{fb}}\right) V_{drv} \quad \text{[Mathematical Equation 1]}$$

That is, since the output voltage Vout of the amplifier A is inversely proportional to the amount of a feedback capacitance Cfb determined by the gain controller 112, and the amount of the feedback capacitance varies by the fourth switches S4_1, S4_2, S4_3, and S4_4, the range of the output voltage Vout of the amplifier A may be changed.

For example, when it is necessary to increase fingerprint detection sensitivity (when it is necessary to widen an output voltage range of an amplifier), some of the currently connected sub-feedback capacitances Cfb_1, Cfb_2, Cfb_3, and Cfb_4 are disconnected using the fourth switches S4_1, S4_2, S4_3, and S4_4 so as to decrease the amount of the feedback capacitance. On the contrary, when it is necessary to decrease fingerprint detection sensitivity (when it is necessary to narrow an output voltage range of an amplifier), some of the currently disconnected sub-feedback capacitances Cfb_1, Cfb_2, Cfb_3, and Cfb_4 are further connected using the fourth switches S4_1, S4_2, S4_3, and S4_4 so as to increase the amount of the feedback capacitance. That is, since the feedback capacitance of the amplifier A varies by the gain controller 112, fingerprint detection sensitivity can be optimized.

The fingerprint detecting apparatus may be installed in various kinds of devices. A power supply voltage, a thickness of a coating layer, etc. may vary according to the kinds of the devices. In addition, they are affected by environmental factors, such as a power supply noise, a package noise, an external noise, etc. in different degrees. According to various embodiments of the present invention, sensitivity can be optimized by adjusting the amount of the feedback capacitance of the amplifier A according to the differences generated by the various factors.

For example, fingerprint detection sensitivity is affected by a thickness of the molding layer m formed on the first conductive layer M1. The sensitivity is increased by decreasing the feedback capacitance of the amplifier A when it is necessary to form a thick molding layer m by design. On the contrary, the sensitivity is optimized by relatively increasing the feedback capacitance of the amplifier A when it is fine to form a thin molding layer.

Meanwhile, the second switch S2 is connected between the first input N1 and the output N2 of the amplifier A. The second switch S2 is a switch for resetting the feedback capacitance of the amplifier A. The second switch S2 is turned on in a preparation step for detection of a fingerprint, and turned off during detection of a fingerprint. The operation of the switches will be described later, in detail.

The second conductive layer M2 includes a guard ring G2 surrounding the first feedback capacitance electrode 115. The guard ring G2 is connected to the ground potential or another appropriate potential to block interference from an adjacent sensing pixel. Although the guard ring G2 is described to have a ring shape in this embodiment, but is not limited thereto. The guard ring G2 may be formed in various shapes, such as a circular shape, a non-circular shape, a polygonal shape, etc. and formed as a protection electrode to minimize interference from an adjacent metal.

A guard ring G3 is formed adjacent to and between the sub-electrodes 117_1, 117_2, 117_3, and 117_4 of the second feedback capacitance electrode 117, and to the entire second feedback capacitance electrode 117. The guard ring G3 is connected to the ground potential or another appropriate potential to minimize of generation of a parasitic capacitance due to a relationship between adjacent sub-electrodes 117_1, 117_2, 117_3, and 117_4. In addition, generation of a parasitic capacitance due to a relationship with an adjacent fingerprint sensor device 110 can be minimized. A plurality of guard rings G3 may be formed. Although the guard ring G3 is described to have a ring shape in this embodiment, it is not limited thereto. The guard ring G1 may be formed in various shapes, such as a circular shape, a non-circular shape, a polygonal shape, an unconnected wall shape, etc. and formed as a protection electrode to minimize interference from an adjacent metal.

According to an embodiment of the present invention, the guard ring G3 may be formed in the third conductive layer M3, like the sub-electrodes 117_1, 117_2, 117_3, and 117_4 of the second feedback capacitance electrode 117. However, according to another embodiment of the present invention, the guard ring G3 may not be formed at the same level in method as the sub-electrodes 117_1, 117_2, 117_3, and 117_4. In this case, as shown in FIG. 3, the guard ring G3 may be formed at a little bit lower level or a little bit higher level than the sub-electrodes 117_1, 117_2, 117_3, and 117_4. When the guard ring G3 is formed at a different level height, a more prominent effect to prevent generation of a parasitic capacitance between the adjacent sub-electrodes 117_1, 117_2, 117_3, and 117_4 can be obtained. According to still another embodiment of the present invention, the guard ring G3 may be omitted.

Meanwhile, the sub-electrodes 117_1, 117_2, 117_3, and 117_4 may be formed at different levels from each other. That is, although the sub-electrodes 117_1, 117_2, 117_3, and 117_4 are described to be formed at the same plane in FIGS. 3 and 4, the sub-electrodes 117_1, 117_2, 117_3, and 117_4 may be formed at different levels from each other according to another embodiment of the present invention.

Meanwhile, the third conductive layer M3, i.e. the sub-electrodes and the guard ring G3 may be formed as part of a metal-insulator-metal (MIM) structure.

By manufacturing the third conductive layer M3 including the plurality of sub-electrodes 117_1, 117_2, 117_3, and 117_4 as part of the MIM structure, the accuracy can be improved, and even when the number of sub-electrodes 117_1, 117_2, 117_3, and 117_4 increases, an influence therebetween, such as short or interference, can be prevented.

The fourth conductive layer M4 is formed under the third conductive layer M3. As described above, the plurality of sub-feedback capacitances Cfb_1, Cfb_2, Cfb_3, and Cfb_4 are selectively connected to the output N2 of the amplifier by the plurality of fourth switches S4_1, S4_2, S4_3, and S4_4. An end of each of the fourth switches S4_1, S4_2, S4_3, and S4_4 is connected to a respective one of the sub-electrodes 117_1, 117_2, 117_3, and 117_4 of the second feedback capacitance electrode 117, and the other end of the fourth switches S4_1, S4_2, S4_3, and S4_4 is connected to the output N2 of the amplifier A through a lowermost electrode 119 included in the fourth conductive layer M4. In addition, the fourth conductive layer M4 may further include an electrode for routing an operating power supply of the amplifier A or other signals, an electrode connected to the ground potential, etc. Another electrode (not shown) included in the third conductive layer M3 may function as an electrode included in the fourth conductive layer M4. In this case, the fourth conductive layer M4 may be omitted. When the fourth conductive layer M4 is omitted, the other ends of the fourth switches S4_1, S4_2, S4_3, and S4_4 are directly connected to the output N2 of the amplifier A.

Hereinafter, operations of the first to third switches S1 to S3 included in a fingerprint detecting apparatus in accordance with an embodiment of the present invention will be described.

Figure 5:
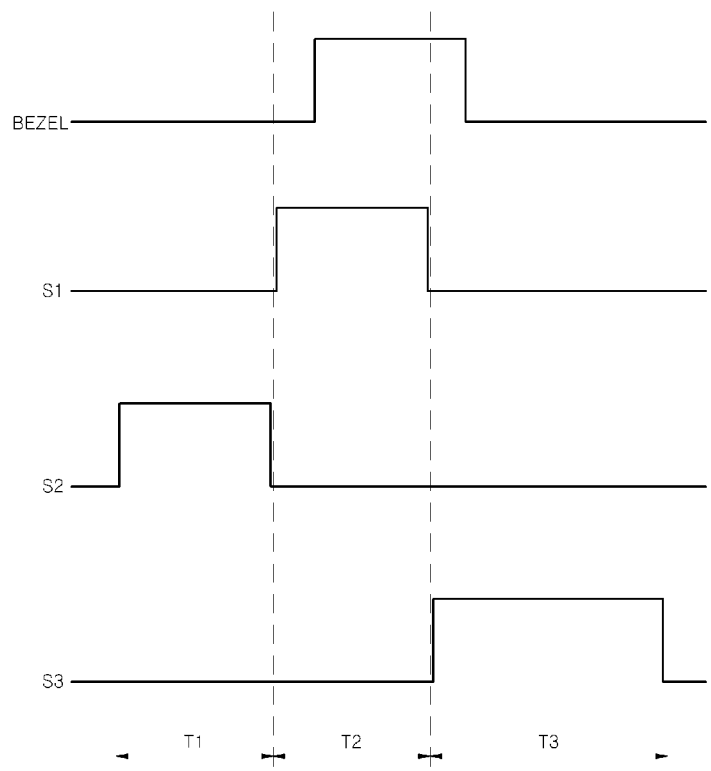
FIG. 5 is a timing chart for describing an operation of the fingerprint sensor device in accordance with the first embodiment of the present invention.

FIG. 5 is a timing chart for describing an operation of each switch in a fingerprint detecting apparatus in accordance with an embodiment of the present invention.

In FIG. 5, each of the switches S1 to S3 has an on-state represented as being high, and an off-state represented as being low. In addition, regarding the external electrode, a high state refers to a state in which a driving voltage Vdrv is applied to the external electrode 200, and a low state refers to a state in which a driving voltage Vdrv is not applied. According to an embodiment of the present invention, the driving voltage Vdrv may be a pulse signal controlled by a clock signal, and implemented in various forms, such as an AC voltage or DC voltage with a predetermined frequency, etc.

Referring to FIGS. 2 to 5, first, the second switch S2 is in an on-state during a period T1, and the first switch S1 and the third switch S3 are in an off-state. While the second switch S2 is an on-state, the feedback capacitance of the amplifier A is reset. At this time, since the first switch S1 is in an off-state, a current does not flow from the sensing electrode 111 to the first input N1 of the amplifier A. Since the plurality of fingerprint sensor devices 110 are arranged at very small intervals in the sensor array 100, each of the fingerprint sensor devices 110 is affected by a current flowing through an adjacent fingerprint sensor device 110. That is, when the current flows through the adjacent fingerprint sensor device 110, a parasitic capacitance is generated due to a relationship with the adjacent fingerprint sensor device 110, resulting in an adverse effect on the accuracy of detection of a fingerprint. According to the embodiments of the present invention, when it is not necessary to apply a signal to the first input N1 of the amplifier A, for example, in a preparation step for detection of a fingerprint, etc., the first switch S1 is turned off to block a current flow and minimize an influence on the adjacent fingerprint sensor device 110. For example, while the adjacent fingerprint sensor device 110 performing an operation of detection of a fingerprint, a first switch S1 of the corresponding fingerprint sensor device 110 is controlled to be in an off-state.

When the reset of the feedback capacitance of the amplifier A is completed, a period T2 starts. The period T2 is a period in which the amplifier A receives a response signal through the sensing electrode 111 in accordance with application of the driving voltage Vdrv, to form an output voltage. When the period T2 starts, the first switch S1 is switched to an on-state and prepared to receive the response signal in accordance with application of the driving voltage Vdrv. The application of the driving voltage Vdrv through the external electrode 200 may be performed at the same time as the first switch S1 is switched to an on-state, or after thereof. During the period T2, the second switch S2 is in an off-state, and a feedback capacitance is formed in the amplifier A. The amount of the feedback capacitance may be changed, as described above, by the plurality of four switches S4_1, S4_2, S4_3, and S4_4 included in the gain controller 112. Meanwhile, during the period T2, the third switch S3 is in an off-state as well.

A period T3 is a period in which the output voltage Vout formed by the amplifier A in the period T2 is output for calculation. During the period T3, the third switch S3 connected to the output N2 of the amplifier A is switched to an on-state, and the first switch S1 and the second switch S2 are in an off-state.

The third switch S3 maintains the on-state for an appropriate time in order to sufficiently transmit the response signal in accordance with the driving voltage Vdrv applied through the external electrode 200. For example, the third switch S3 maintains the on-state until a potential of the external electrode 200 falls to 0 V (or a ground voltage). The period in which the driving voltage Vdrv is applied through the external electrode 200, and the period in which the third switch S3 maintains the on-state may overlap or not, as shown in FIG. 5.

Figure 6:
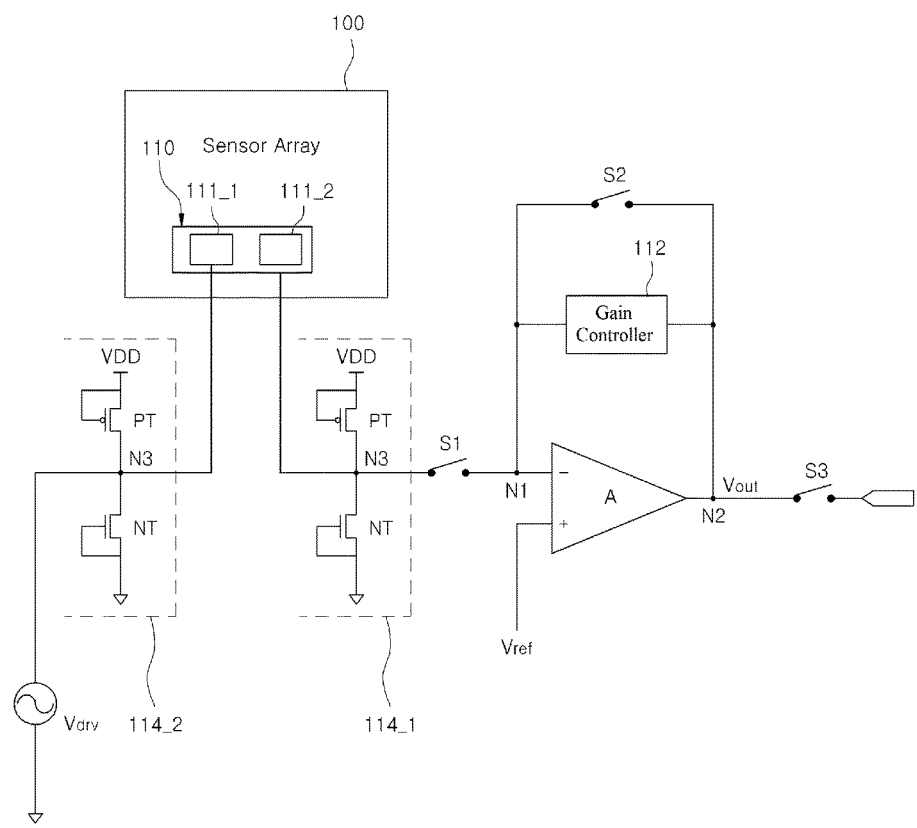
FIG. 6 is a diagram for describing a configuration of a fingerprint sensor device in accordance with a second embodiment of the present invention.

FIG. 6 is a diagram for describing a configuration of the fingerprint sensor device 110 of FIG. 1 in accordance with a second embodiment of the present invention.

Referring to FIG. 6, a plurality of fingerprint sensor devices 110 are arranged to form columns and rows, and configure a sensor array in the second embodiment of the present invention as well. Comparing to the first embodiment described with reference to FIG. 2, the external electrode (200, see FIG. 2) is omitted, and a single fingerprint sensor device 110 includes a driving voltage applying electrode 111_1 and a sensing electrode 111_2.

According to the second embodiment of the present invention, a driving voltage Vdrv is applied through the driving voltage applying electrode 111_1 of each fingerprint sensor device 110, a response signal from a finger F is input to a first input N1 of an amplifier A through the sensing electrode 111_2. That is, it is understood that the driving voltage applying electrode 111_1 of the fingerprint sensor device 110 in the second embodiment functions as the external electrode 200 in the first embodiment.

In addition, ESD protection circuits 114_1 and 114_2 may be formed at a path through which a driving voltage Vdrv is applied to the driving voltage applying electrode 111_1 in addition to between the sensing electrode 111_2 and the amplifier A. Other configurations are the same as those described in FIG. 2, and descriptions thereof are omitted herein.

Figure 7:
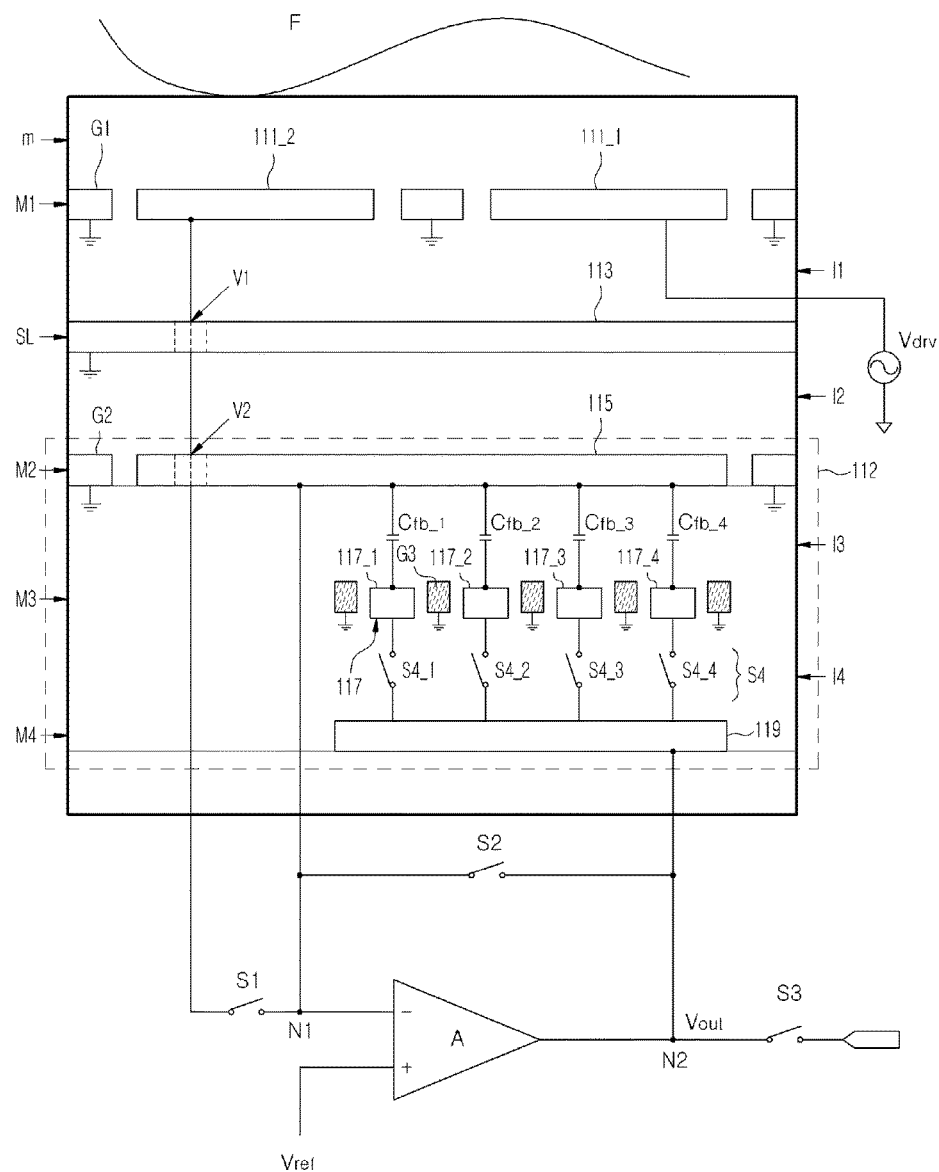
FIGS. 7 and 8 are respectively a cross-sectional view and a perspective view showing a configuration of the fingerprint sensor device in accordance with the second embodiment of the present invention.
Figure 8:
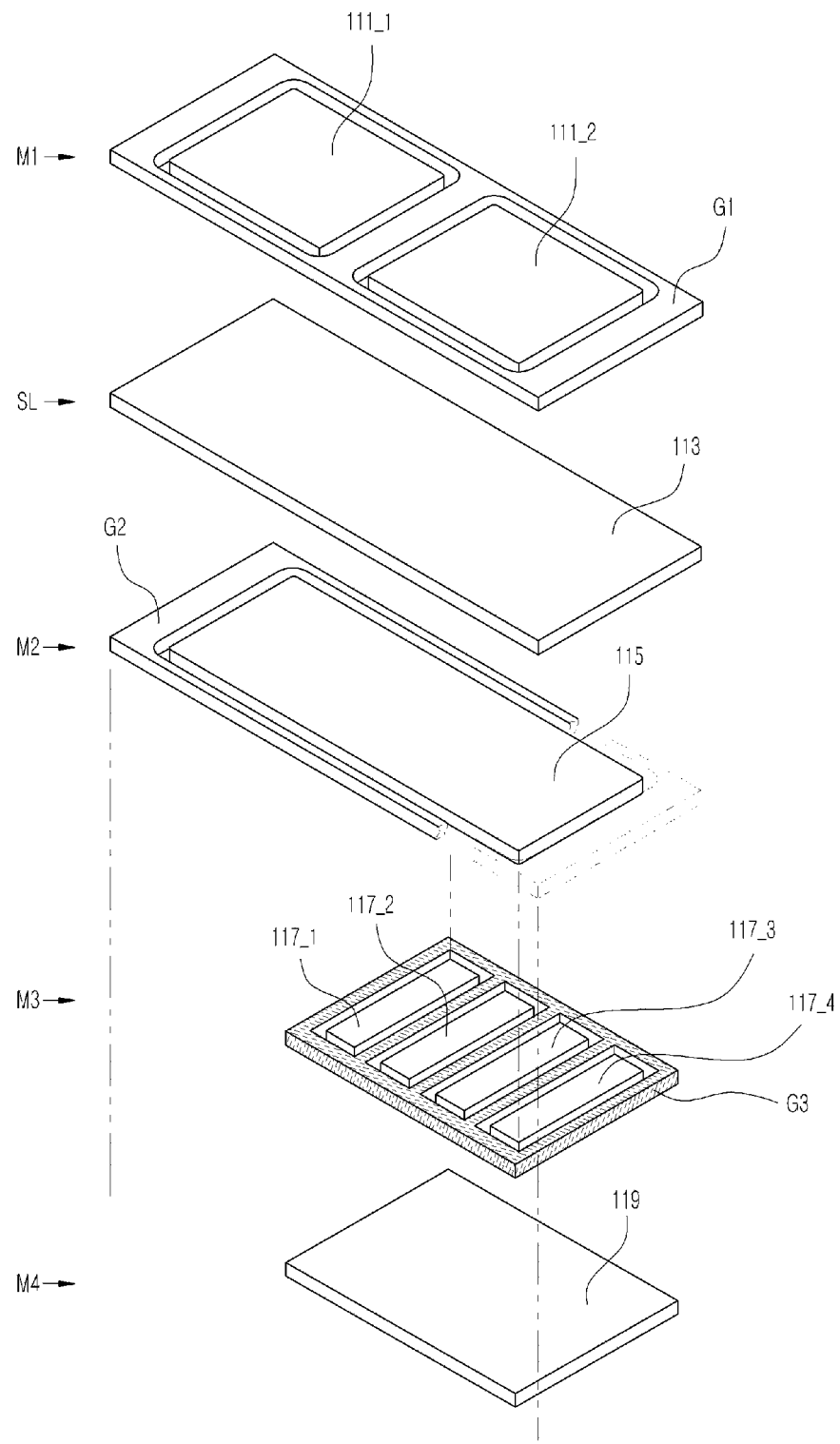

FIGS. 7 and 8 are cross-sectional view and a perspective view showing a configuration of the fingerprint sensor device 110 of FIG. 6.

Referring to FIGS. 7 and 8, configurations of the fingerprint sensor device 110 in accordance with the second embodiment of the present invention are the same as those of the fingerprint sensor device 110 in accordance with the first embodiment of the present invention, except a configuration of a first conductive layer M1.

The first conductive layer M1 includes the driving voltage applying electrode 111_1 and the sensing electrode 111_2. As described above, a driving voltage Vdrv is applied to the driving voltage applying electrode 111_1, and the sensing electrode 111_2 transmits a response signal from the finger F in accordance with application of the driving voltage Vdrv to the first input N1 of the amplifier A. That is, the sensing electrode 111_2 is connected to the first input N1 of the amplifier A, and the connection is turned on/off by a first switch S1. Operations of first to third switches S1 to S3 are the same as described with reference to FIG. 5. A guard ring G1 is formed in a periphery of the driving voltage applying electrode 111_1 and a periphery of the sensing electrode 111_2. Since the guard ring G1 is formed between the driving voltage applying electrode 111_1 and the sensing electrode 111_2 as well, generation of a parasitic capacitance due to the relationship between the driving voltage applying electrode 111_1 and the sensing electrode 111_2 can be suppressed.

Descriptions of second to fourth conductive layers M2 to M4 and the shield layer SL are the same as described in the first embodiment of the present invent, and thus omitted herein.

Descriptions of second to fifth conductive layers M2 to M5 are the same as described in the first embodiment of the present invent, and thus omitted herein.

In a feedback capacitive sensing type fingerprint detecting apparatus in accordance with the embodiments of the present invention, since a feedback capacitance of an amplifier is variable, fingerprint detecting sensibility can be variably optimized depending on the circumstances.

In addition, according to the embodiments of the present invention, a fingerprint detecting apparatus in which influence of external noise, influence of parasitic capacitance in design, influence of electrostatic discharge, etc. are minimized can be obtained.

It will be apparent to those skilled in the art that various modifications can be made to the above-described exemplary embodiments of the present invention without departing from the spirit or scope of the invention. The various embodiments are merely exemplary and are not meant to limit the scope of the invention. For example, each component described as a single element may be implemented in a distributed manner, and components described as distributed elements may be implemented by being combined with each other.

The scope of the invention is, therefore, indicated by the appended claims. All changes that come within the meaning, range, and equivalency of the claims are to be embraced within their scope.

What is claimed is:
1. A fingerprint detecting apparatus, comprising:
a plurality of fingerprint sensor devices,
wherein each of the plurality of fingerprint sensor devices comprises:
a first conductive layer;
a sensing electrode formed in the first conductive layer and configured to receive a response signal from a subject according to an application of a driving voltage;
a shield layer formed under the first conductive layer, wherein the shield layer is connected to a ground potential;
a second conductive layer formed under the shield layer;
a third conductive layer formed under the second conductive layer;
an amplifier configured to receive the response signal and generate an output signal by amplifying the received response signal according to a gain of the amplifier,
wherein the amplifier receives the response signal and outputs the output signal from each fingerprint sensor device independently; and
a gain controller formed under the shield layer and connected to an input and an output of the amplifier and configured to vary the gain of the amplifier,
wherein the gain controller includes a plurality of sub-electrodes formed in the third conductive layer forming a plurality of feedback capacitances between the plurality of sub-electrodes and the second conductive layer, and
wherein each of the plurality of sub-electrodes is selectively connected to the output of the amplifier to vary the gain of the amplifier.

2. The fingerprint detecting apparatus of claim 1, further comprising an external electrode configured to apply the driving voltage to the subject.

3. The fingerprint detecting apparatus of claim 1, wherein the first conductive layer comprises:
a driving voltage applying electrode configured to apply the driving voltage to the subject, wherein the sensing electrode is spaced apart from the driving voltage applying electrode.

4. The fingerprint detecting apparatus of claim 1, further comprising a fourth conductive layer formed under the third conductive layer, wherein the fourth conductive layer is connected to the output of the amplifier and selectively connected to each of the plurality of sub-electrodes.

5. The fingerprint detecting apparatus of claim 4, further comprising a plurality of switches, wherein each of the plurality of switches is connected between each of the plurality of sub-electrodes and the fourth conductive layer, and
wherein the plurality of switches are configured to selectively connect the plurality of sub-electrodes to the fourth conductive layer to vary the gain of the amplifier.

6. The fingerprint detecting apparatus of claim 1, wherein the third conductive layer includes a guard electrode formed between each of the plurality of sub-electrodes, spaced apart from each of the plurality of sub-electrodes, and connected to the ground potential.

7. The fingerprint detecting apparatus of claim 1, further comprising:
a first switch configured to switch connection between the first conductive layer and the input of the amplifier;
a second switch connected to the input of the amplifier and the output of the amplifier and configured to reset the gain controller; and
a third switch connected to the output of the amplifier and configured to selectively output the output signal.

8. The fingerprint detecting apparatus of claim 6, wherein the first switch maintains an on-state while the driving voltage is applied to transmit the response signal to the input of the amplifier,
wherein the second switch maintains an on-state before the driving voltage is applied and resets the gain controller, and
wherein the third switch maintains an on-state after the driving voltage is applied, and outputs the output signal of the amplifier.

9. The fingerprint detecting apparatus of claim 1, wherein the third conductive layer is formed as part of a metal-insulator-metal (MIM) structure.

10. The fingerprint detecting apparatus of claim 1, wherein the first conductive layer includes a guard ring formed apart from the sensing electrode to surround the sensing electrode and connected to the ground potential.

11. The fingerprint detecting apparatus of claim 1, wherein the second conductive layer comprises:

a feedback capacitance electrode forming a feedback capacitance with the third conductive layer; and a guard ring formed apart from the feedback capacitance electrode to surround the feedback capacitance electrode and connected to the ground potential.

12. A method of driving a fingerprint detecting apparatus including a plurality of fingerprint sensor devices, each of the plurality of fingerprint sensor devices having a first conductive layer, a shield layer formed under the first conductive layer, a second conductive layer formed under the shield layer, and a third conductive layer formed under the second conductive layer, comprising:

resetting a gain controller, wherein the gain controller is formed under the shield layer and connected to an input and an output of an amplifier and configured to vary a gain of the amplifier;

connecting a sensing electrode to the input of the amplifier, wherein the sensing electrode is formed in the first conductive layer and configured to receive a response signal from a subject according to an application of a driving voltage, and wherein the input of the amplifier receives the response signal through the connection;

determining, by the gain controller, the gain of the amplifier, wherein the gain controller includes a plurality of sub-electrodes formed in the third conductive layer forming a plurality of feedback capacitances between the plurality of sub-electrodes and the second conductive layer, and wherein the plurality of feedback capacitances are selectively connected to the output of the amplifier to vary the gain of the amplifier;

generating an output signal of the amplifier by amplifying the received response signal according to the gain of the amplifier; and connecting the output of the amplifier to an external apparatus to output the output signal of the amplifier.

13. The method of claim 12, wherein the driving voltage is applied to the subject through an external electrode.

14. The method of claim 12, wherein the driving voltage is applied to the subject through a driving voltage applying electrode formed apart from the sensing electrode in the first conductive layer.

15. The method of claim 12, wherein the determining of the gain of the gain controller comprises selectively connecting the plurality of feedback capacitances to a fourth conductive layer, wherein the fourth conductive layer is formed under the third conductive layer and connected to the output of the amplifier.

16. The method of claim 12, wherein the resetting of the gain controller, the connecting of the sensing electrode to the input of the amplifier, and the connecting of the amplifier output to the external apparatus are performed exclusively from each other.

17. The method of claim 12, wherein the amplifier receives the response signal and outputs the output signal to the external apparatus from each fingerprint sensor device independently.

* * * * *